United States Patent [19]

Huang

[11] Patent Number: 5,131,275
[45] Date of Patent: Jul. 21, 1992

[54] GAS PRESSURE GAGE

[76] Inventor: Tien-Tsai Huang, No. 4, Lane 30, Wu-Chang St., Pan-Chiao City, Taiwan

[21] Appl. No.: 679,261

[22] Filed: Apr. 2, 1991

[51] Int. Cl.[5] ............................................. G01L 7/00
[52] U.S. Cl. ....................................... 73/756; 73/115; 73/146.8; 73/732; 137/228; 137/230
[58] Field of Search ...................... 73/146.8, 115, 756, 73/146.2, 146.3, 146.4, 146.5, 706, 709, 714, 732, 738, 733-737, 739-743; 137/227, 228, 229, 230

[56] References Cited

U.S. PATENT DOCUMENTS 1,270,952  7/1918  Jones .................................. 137/227
1,330,311  2/1920  Engelmann ........................ 73/146.8

*Primary Examiner*—Donald O. Woodiel
*Attorney, Agent, or Firm*—Oblon, Spivak, McClelland, Maier & Neustadt

[57] ABSTRACT

A gas pressure gage connected to a pressure tank includes a solid stem body which has a gas channel extending from the first end to the second end thereof. The solid stem body further includes a cavity which communicates the gas channel with the exterior of the gage. A spring-biased piston rod disposed in the cavity, provided with a sealing member, seals the gas channel unless the gas pressure in the gas channel exceeds the force of the spring member, or the piston rod is operated manually.

4 Claims, 1 Drawing Sheet

GAS PRESSURE GAGE

FIELD OF THE INVENTION

This invention relates to a pressure gage, more particularly to a gas pressure gage having a relief valve which may be operated automatically or manually.

DESCRIPTION OF RELATED ART

One conventional type of pressure gage does not has a relief valve. Even if the pressure in the pressure tank exceeds a predetermined level, the gas cannot be released by this type of pressure gage. A second improved conventional pressure gage has a manual relief device. If the gage indicates that the pressure in the pressure tank too high, the gas can be released through the relief device by hand. Since the relief device of the second conventional pressure gage is actuated by hand, the danger of explosion remains, because the excess pressure is only relieved by a delicate act.

SUMMARY OF THE INVENTION

Therefore, the object of this invention is to provided a gas pressure gage having a relief valve. The gas pressure gage is used to simultaneously indicate and control the pressure in a pressure tank or the like.

Accordingly, the gas pressure gage of this invention is connected to a pressure tank. The gas pressure gage includes a dial body having an indicator, and a solid stem body. The solid stem body has a first end connected to the dial body, and a second end connected to the pressure tank. The solid stem body includes a gas channel extending from the first end to the second end. The gas flows through the gas channel from the pressure tank to the dial body, actuating the indicator. The solid stem body includes a cavity which has outer open end, and an passage communicating the gas channel and the interior of the cavity. A relief valve is provided in the cavity and includes a stopper member detachably connected adjacent to the outer open end of the cavity. A piston rod has a first end received in the cavity, and a second end extending out of the cavity, passing through the stopper member. The second end of the piston rod has a handle connected thereto. The first end of the piston rod has an enlarged head. A sealing member is mounted between the enlarged head and the passage of the cavity. A spring member is mounted between the enlarged head of the piston and the stopper member to bias the sealing member to close the passage of the cavity.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENTS

Figure 1:
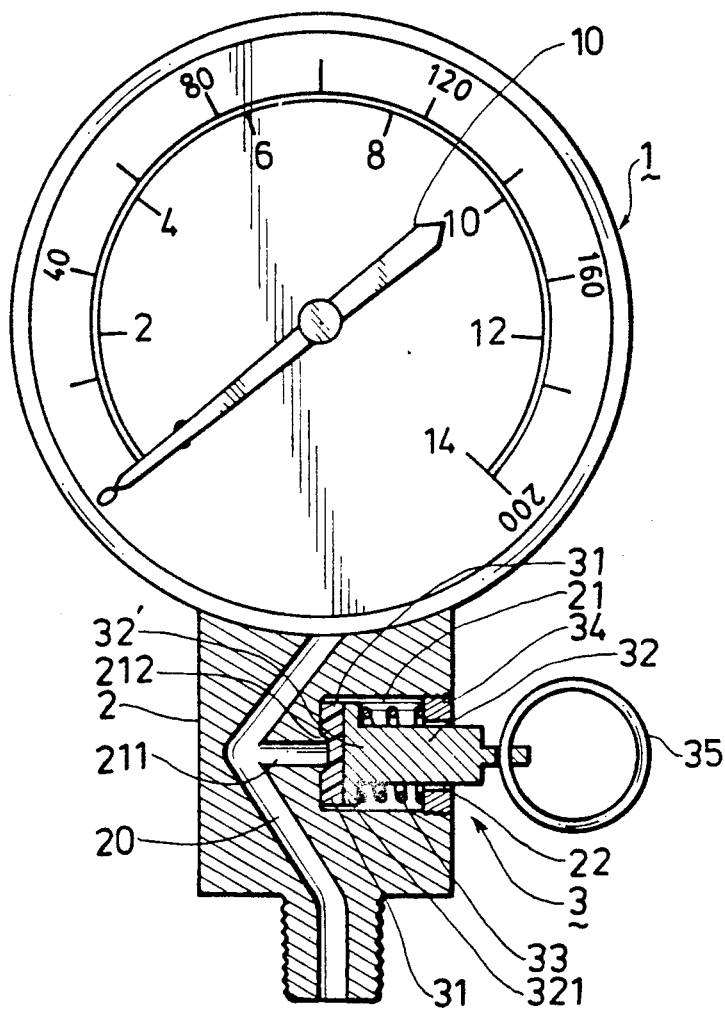
FIG. 1 is a sectional view of a preferred embodiment of the gas pressure gage of this invention.

Referring to FIG. 1, a gas pressure gage of this invention is connected to a pressure tank (not shown). The gas pressure includes a dial body 1 having an indicator 10, and a solid stem body 2. The solid stem body 2 has a first end connected to the dial body 10, and a second end connected to the pressure tank. The solid stem body 2 has a bent longitudinal gas channel 20 extending from the first end to the second end through which channel 20 the gas flows from the pressure tank to the dial body 1 to actuate the indicator 10 of the dial body 1. The solid stem body 2 has a cavity 21. The cavity 21 includes an outer open end 22, and a transverse passage 211 communicating the gas channel 20 and the interior of the cavity 21.

A relief valve 3 is provided in the cavity 21. The relief valve 3 includes a stopper member 34. The stopper member 34 has a central through hole and is threadedly connected to the cavity 21 at the outer open end 22. A piston rod 32 includes a first end received in the cavity 21, and a second end extending out of the cavity 21 passing through the central through hole of the stopper member 34. The second end of the piston rod 32 has a ring handle 35 connected thereto. The first end of the piston rod 32 has an enlarged head 32' which includes a radially outwardly extending flange 321. The cavity 21 has a shoulder formed adjacent the passage 211. An annular lip 212 is mounted at the shoulder of the cavity 21, adjacent to the passage 211 of the cavity 21. A sealing member 31 is of rubber and is mounted between the enlarged head 32' of the piston rod 32 and the passage 211. A spring 33 is sleeved over the piston rod 32, between the flange 321 of the enlarged head 32' of the piston rod 32 and the stopper member 34. The spring member 33 urges the sealing member 31 into sealed contact with the annular lip 212, closing the passage 211 of the cavity.

The sealing member 31 has a cross-section smaller than the cross-section of the cavity 21. The piston rod 32 has a cross-section smaller than the cross-section of the cavity 21. The cross-section of the piston rod 21 is smaller than the cross-section of the central through hole of the stopper member 34. Therefore, a gas outlet is formed between the wall of the cavity 21 and the sealing member 31, between the wall of the cavity 21 and the piston rod 32, and between the piston rod 32 and the stopper member 34.

In operation, the second end of the solid stem body 2 is connected to the pressure tank. The gas flowing from the pressure tank to the dial body 10 actuates the indicator 10 of the dial body 1. When the gas pressure in the pressure tank is greater than the elastic force of the spring member 33, the gas pressure pushes the sealing member 31 and the piston rod 32 outwards against the elastic force of the spring member 33, permitting the gas to be released through the gas outlet. When the gas pressure in the pressure tank is less than the elastic force of the spring member 33, the spring member 33 urges the sealing member into sealed contact with the annular lip 212, closing the passage 211 of the cavity 21. The gas pressure gage of this invention can be used to determine the various pressures of pressure tanks or gas vessels because the coefficient of elasticity of the spring member 33 is changeable. The gas pressure gage also permits the gas to be released when the gas pressure is less than the elastic force of the spring member 33, by pulling the ring handle 35 outwards.

The relief valve of the gas pressure gage of this invention can be operated automatically or manually, therefore the gas pressure gage can simultaneously indicate and control the pressure of a gas in the pressure tank.

While the present invention has been described in connection with what is considered the most practical and preferred embodiments it is understood that this invention is not limited to the disclosed embodiments, but is intended to cover various arrangements included within the spirit and scope of the broadest interpretation so as to encompass all such modifications and equivalent arrangements.

I claim:

1. A gas pressure gage connected to a pressure tank or the like, comprising:
    a dial body for indicating a gas pressure in said pressure tank; and
    a solid stem body having a first end connected to said dial body, and a second end connected to said pressure tank, said solid stem body having a gas channel extending from said first end to said second end for permitting gas flow from said pressure tank to said dial body;
   wherein:
    said solid stem body includes a cavity having an outer open end and a passage communicating said gas channel and an interior of said cavity; and
    a relief valve for controlling gas pressure in said pressure tank is provided in said cavity and includes a stopper member detachably connected adjacent to said outer open end of said cavity, said relief valve comprising a piston rod having a first end received in said cavity and a second end extending out of said cavity and passing through said stopper member, said second end of said piston rod having a handle connected thereto, said first end of said piston rod having an enlarged head, a sealing member being mounted between said enlarged head and said passage of said cavity, a spring member being mounted between said enlarged head of said piston rod and said stopper member to bias said sealing member to close said passage of said cavity, such that said dial body and said relief valve respectively simultaneously indicate and control gas pressure in said pressure tank.

2. A gas pressure gage as claimed in claim 1, wherein said sealing member has a cross-section smaller than the cross-section of said cavity.

3. A gas pressure gage as claimed in claim 2, wherein said piston rod has a cross-section smaller than the cross-section of said cavity.

4. A gas pressure gage as claimed in claim 3, wherein said stop member in said cavity defines a passage for the outward extending of said piston rod, said cross-section of said piston rod being smaller than the cross-section of said passage.

* * * * *